United States Patent [19]

Katagiri et al.

[11] 4,448,287
[45] May 15, 1984

[54] CALIPER HOUSING IN A DISC BRAKE

[75] Inventors: Masayoshi Katagiri, Toyota; Toshio Kondo, Okazaki, both of Japan

[73] Assignees: Toyota Jidosha Kogyo Kabushiki Kaisha, Toyota; Aisin Seiki Kabushiki Kaisha, Kariya, both of Japan

[21] Appl. No.: 320,979

[22] Filed: Nov. 13, 1981

[30] Foreign Application Priority Data

Nov. 21, 1980 [JP] Japan .......................... 55-167722[U]

[51] Int. Cl.³ .............................................. F16D 55/00
[52] U.S. Cl. ................................ 188/73.31; 188/73.45; 188/264 A
[58] Field of Search ............... 188/73.31, 73.32–73.47, 188/205, 206, 71.6, 72.4–72.6, 264 A, 264 AA, 264 R, 370, 369, 367, 71.1

[56] References Cited

U.S. PATENT DOCUMENTS

| 3,150,745 | 9/1964 | Eksergian | 188/72.4 X |
|---|---|---|---|
| 3,361,229 | 1/1968 | Swift | 188/72.4 |
| 3,548,973 | 12/1970 | Laverdant | 188/72.5 |
| 3,677,372 | 7/1972 | Burnett | 188/73.45 |
| 4,082,167 | 4/1978 | Einchcombe et al. | 188/73.34 |
| 4,094,389 | 6/1978 | Brix et al. | 188/73.45 |
| 4,200,173 | 4/1980 | Evans et al. | 188/73.45 |
| 4,331,221 | 5/1982 | Evans et al. | 188/73.31 X |
| 4,360,079 | 11/1982 | Belart | 188/73.39 X |

FOREIGN PATENT DOCUMENTS

| 2340241 | 2/1975 | Fed. Rep. of Germany | 188/73.33 |
|---|---|---|---|
| 2753821 | 6/1978 | Fed. Rep. of Germany | 188/73.45 |
| 1340290 | 9/1963 | France | |
| 1194435 | 6/1970 | United Kingdom | |
| 1355960 | 6/1974 | United Kingdom | |
| 2016617 | 9/1979 | United Kingdom | |
| 2018920 | 10/1979 | United Kingdom | |
| 2042659 | 9/1980 | United Kingdom | |

OTHER PUBLICATIONS

"Lightweight Disc Brakes for Small Cars" from May 1977, vol. 85, No. 5 issue of *Automotive Engineering*, pp. 44–47.

*Primary Examiner*—Douglas C. Butler
*Attorney, Agent, or Firm*—Oblon, Fisher, Spivak, McClelland & Maier

[57] ABSTRACT

An improved disc brake caliper housing structure including a cylinder portion which has a cylinder wall section formed with a cylinder having a cylinder bore, a reaction portion located opposite to the cylinder portion axially of the cylinder, and a bridging portion connecting the cylinder and reaction portions. The bridging portion has a cross section, taken perpendicularly to the axis of the cylinder, which is of substantially circular arc configuration along the periphery of a disc rotor, and the cylinder wall section which has a fan-shaped profile to which the circumferential wall of the cylinder is virtually inscribed, has openings spaced radially of the cylinder. The openings are formed between both ends of the circular arc of the bridging portion, and those two segments of the circumferential wall of an open end portion of the cylinder which are nearest to the both ends of the bridging portion radially of the cylinder. This caliper housing structure provides improvements in reducing the wall thickness of the bridging portion while preventing its cylinder bore from being deformed upon brake application.

6 Claims, 9 Drawing Figures

CALIPER HOUSING IN A DISC BRAKE

BACKGROUND OF THE INVENTION

The present invention generally relates to an improved caliper in a disc braking system and, more particularly, to improvements in structure of the caliper housing for increased performance and prolonged service life of the braking system.

A caliper or caliper housing for use in a disc brake system comprises: a brake actuating hydraulic cylinder portion which includes a cylinder wall section having a cylinder bore open at one end thereof; a reaction portion which is positioned opposite to the cylinder portion axially of a disc rotor; and a bridging portion which extends between the opposing cylinder and reaction portions for connecting them. These three portions constitute an integral and substantially saddle-shaped structure which is adapted to straddle the disc rotor and a pair of brake pad assemblies disposed on opposite sides of, and in parallel to, the disc rotor, and which is adapted to be supported by a torque member movably along the axis of the rotor. Because the disc rotor and the caliper straddling the disc rotor are disposed in a limited open space formed inside the rim of a wheel to be braked, the maximum permissible diameter of the rotor is limited by the particular wall thickness of the bridging portion of the caliper. Therefore, it has been a long-felt but unsolved need to maximize the diameter of the disc rotor for enhancing the braking performance, and, more particularly, to increase the working area of the brake pad assemblies for prolonging an interval of maintenance of the braking system.

According to research of the inventors, the above requirement may be met by means of increasing the rigidity of the bridging portion, while reducing the wall thickness thereof, by forming the bridging portion so that it has a cross section, taken perpendicularly to the axis of the cylinder portion, which is of a relatively long circular arc configuration along the periphery of the rotor for forming an integral reinforcement structure or shell structure in combination with the cylinder portion and the reaction portion. Since, however, the cylinder portion of such type of caliper includes the cylinder wall section which extends radially inwardly of the rotor from the extremity of the bridging portion so that it faces the reaction portion and which has the cylinder bore open at one end thereof, it is unavoidable that the cylinder bore formed therein to roundness is deformed to an elliptical shape upon application of a reaction force transmitted thereto via the said wall section when a brake pad urging force is applied to the caliper upon actuation of the brake. Such deformation of the cylinder bore upon brake application will not only prevent normal operation of a piston slidably received in the bore in a fluid-tight manner, but also cause an abnormally rapid wearing of the piston and mating bore surfaces which results in fluid leaking from the cylinder.

SUMMARY OF THE INVENTION

The present invention was made in view of the above situation. Accordingly, it is a principal object of the invention to provide a disc brake caliper, the bridging portion of which has a cross section, taken along the sides of a disc rotor, which is of relatively long circular arc configuration along the periphery of the disc rotor, wherein the open end portion of the cylinder bore in the cylinder portion of the caliper has less deformation upon brake application.

To attain the above object, a disc brake caliper of this invention comprises a bridging portion which has a substantially circular arc configuration along the periphery of a disc rotor in cross section taken along the sides thereof, and further comprises a cylinder portion, the cylinder wall section of which, having a cylinder bore therein, is of sector- or fan-like configuration to which the outer circumferential surface of the cylinder wall is virtually inscribed, the fan-like cylinder wall section having openings therein which are formed between both ends of the circular arc of the bridging portion and the cylinder bore, more precisely, between the said both ends and those two segments of the circumference of the open end portion of the cylinder wall which are nearest to the said both ends of the bridging portion radially of the cylinder bore.

The said openings formed in the cylinder wall section protect the open end portion of the cylinder bore against deformation upon brake application which prevents normal operation of the piston, thereby producing excellent effects in preventing abnormal wear of the piston and mating cylinder bore surfaces and the resultant leakage of brake fluid.

This and other objects, features and advantages of the present invention will be seen by reference to the following description taken in combination with the accompanying drawings.

BRIEF DESCRIPTION OF THE DRAWINGS

A preferred embodiment of this invention is illustrated in the accompanying drawings in which.

DETAILED DESCRIPTION OF THE PREFERRED EMBODIMENTS

Referring now to the accompanying drawings, hereunder is provided a detailed description of the preferred embodiment of the present invention.

Figure 1:
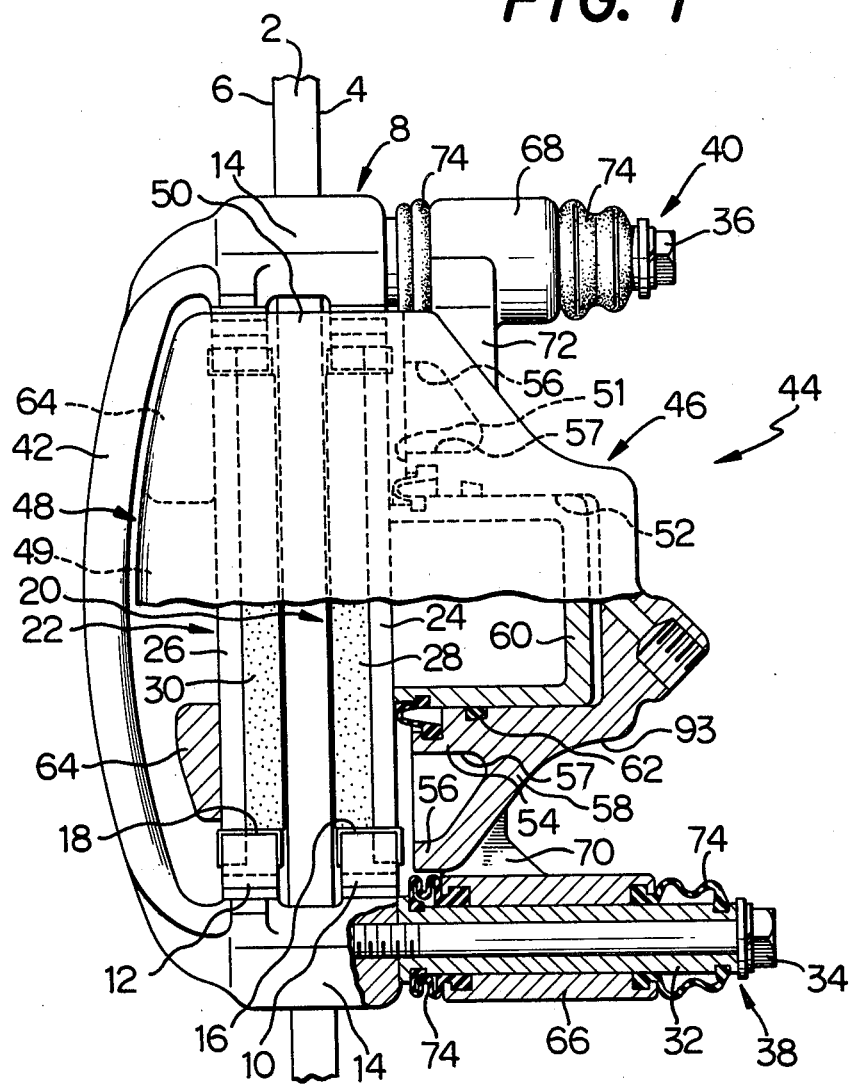
FIG. 1 is a plan view, partly in cross section, of a disc brake including a preferred embodiment of a caliper of this invention.

FIG. 1 shows a pin-sliding caliper type of disc brake, wherein a disc rotor 2 has friction surfaces 4 and 6 on opposite sides thereof and rotates about its axis together with an axle of a vehicle (not shown). Adjacent to the disc rotor 2 is disposed a non-rotatable torque member 8 in such manner as to straddle the rotor 2. The torque member 8 includes planar portions 10 and 12 extending parallel to the friction surfaces 4 and 6, and a connecting portion 14 extending axially of the disc rotor over the periphery thereof and connecting the planar portions 10 and 12 at two positions. The torque member 8 is fixed to the knuckle, axle housing or other non-rotatable members of the vehicle. In the central parts of the planar portions 10 and 12 are formed openings 16 and 18, respectively, within which an inner pad assembly 20 and an outer pad assembly 22 are movably received, respectively, so that they face the friction surfaces 4 and 6. The inner pad assembly 20 consists of a backing plate 24 and a friction member 28, and the outer pad assembly 22 consists of a backing plate 26 and a friction member 30. On both sides of the opening 16 are fixed a pair of mutually parallel pins 38 and 40 to the torque member 8. Each of the pins 38 and 40 includes a sleeve 32 and a bolt 34, 36 inserted therethrough to retain the former. Further, on the side opposite to the pins 38 and 40, there is formed an arcuately extending reinforcement rib 42 as an integral part of the planar portion 12, both ends thereof merging into the said planar portion 12 at positions symmetrical, with respect to the disc rotor 2, to the positions at which the pair of pins 38 and 40 are retained.

Figure 2:
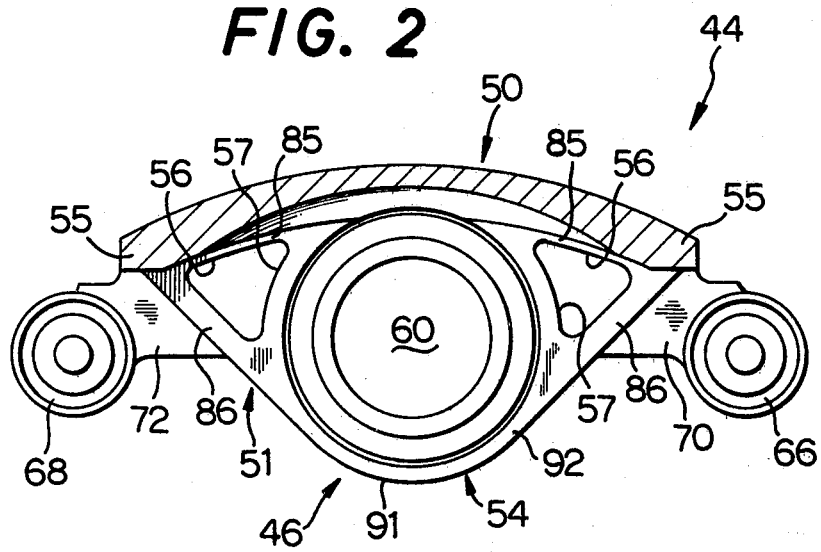
FIG. 2 is a cross sectional elevational view of the caliper of FIG. 1.
Figure 3:
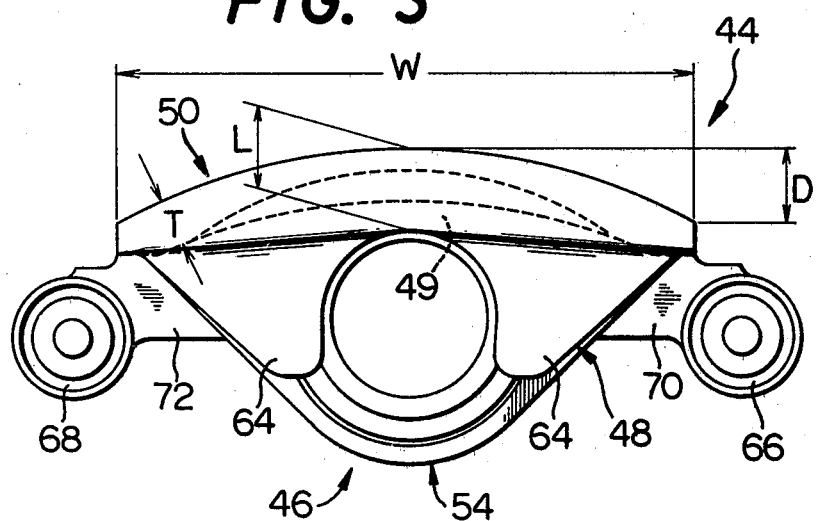
FIG. 3 is an elevational view of the caliper of FIG. 1.

As illustrated also in FIG. 2, a caliper 44 having a substantially saddle-like shape comprises a hydraulic cylinder portion 46, a reaction portion 48 facing the cylinder portion, and a bridging portion 50 which extends between the cylinder and reaction portions 46 and 48 for connecting them at upper ends thereof and which has a circular arc configuration along the periphery of the disc rotor in cross section taken along the sides thereof. The caliper 44 thus straddles the disc rotor 2 and the pad assemblies 20 and 22 disposed on both sides thereof. The cylinder portion 46 has a sector- or fan-shaped cylinder wall section 51 which extends radially inwardly of the rotor from the extremity of the bridging portion 50 so that it faces the reaction portion 48. The wall section 51 is formed with a cylinder 54 which has a cylinder bore 52 and whose circumference 91 is virtually inscribed to the profile of the wall section 51. This wall section 51 constitutes, in combination with the bridging portion 50, a rigid reinforcement frame structure or shell structure. The wall section 51 has, in addition to the cylinder bore 52, two substantially triangular openings 56 which are spaced circumferentially of the cylinder bore 52 and which are formed between both end portions 55 of the bridging portion 50 and the cylinder bore 52 and, more precisely, between the said end portions 55 and those two segments 57 of the circumferential wall 91 of the open end portion of the cylinder 54 which are defined by or marked off two pairs of points of tangency of lines passing the said end portions 55 with the circumferential wall 91 or which, in other words, are nearest to the said end portions 55 radially of the cylinder bore, each of the openings 56 triangular in vertical cross section including the outer circumferential surface of the cylinder 54 as one of three inner surfaces thereof defining a triangle. The cylinder 54 is supported by the cylinder wall section 51, and by a curved wall 58 which extends from the extremity of the bridging portion 50 and terminates in the bottom outer surface 93 of the cylinder. In the cylinder bore 52, there is slidably received a piston 60 in a fluid-tight manner with a piston seal 62 interposed between the former and the latter. The piston seal 62 is deformed through its resiliency when the piston 60 is forced out by pressurized fluid, and the deformed seal acts to return the piston 60 to its original non-operating position when the fluid pressure is removed. As shown in FIG. 3, the reaction portion 48 consists of an arcuate or crescent-shaped end wall 49 which extends radially inwardly of the disc rotor from the extremity of the bridging portion 50 remote to the cylinder portion 46 so that it faces the cylinder 54, and a pair of jaw portions 64 which extend radially inwardly further from the end wall 49 so that their axial thickness decreases toward its tip. The end wall 49 is formed with its thickness increasing toward its central portion in the circumferential direction of the disc rotor 2, and the bridging and reaction portions 50 and 48 constitute an integral reinforcement frame structure which gives the caliper an increased rigidity. When assumed that (a) the width of the bridging portion 50 is W, (b) the thickness thereof is T, (c) the depth of the circular arc of the bridging portion 50 is D, and (d) the distance from the external periphery of the bridging portion 50 to the lower end of the end wall 49 in the middle portion thereof is L, W/T is preferably in the invented caliper not less than 11 against the traditional value 4–9, in particular preferably in the range of 12–20; D/T is preferably not less than 1.3 against the traditional value 0.3–0.7, with a particular desirable range of 1.5–2.5; and L/T is preferably not less than 1.4 against the traditional value of 1 or less, and with a particularly recommendable range of a value is 1.5–2.5.

On both sides of the cylinder portion 46 of the caliper 44 constructed as described above, are provided a pair of arms 70 and 72, each of which includes a boss 66, 68 at its end through which the slide pin 38, 40 is inserted as shown in FIG. 1, whereby the caliper 44 is supported freely movably in the direction parallel to the axis of the disc rotor 2. The slide pins 38 and 40 are provided at their exposed portions with dust-tight boots 74.

When the thus arranged disc brake is actuated, the piston 60 is pushed out by pressurized fluid toward and then onto the inner pad assembly 20 which, in turn, is urged onto the friction surface 4 of the disc rotor 2, and by reaction the reaction portion 48 urges the outer pad assembly 22 onto the friction surface 6. As a result of this operation, the caliper 44 is subjected to deflection in the directions that cause the cylinder and reaction portions 46 and 48 to move or open away from each other axially of the disc rotor.

Figure 4:
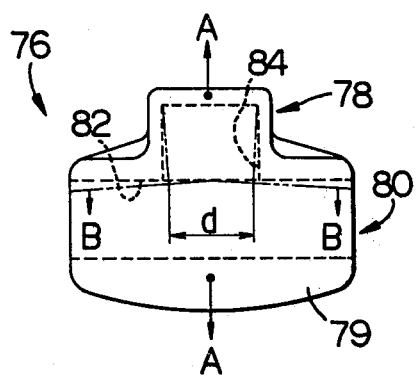
FIGS. 4 and 5 are respectively a plan view and a cross sectional elevational view of a caliper disclosed in copending application Ser. No. 320,932, for explaining delivery of force applied to the caliper upon brake application.
Figure 5:
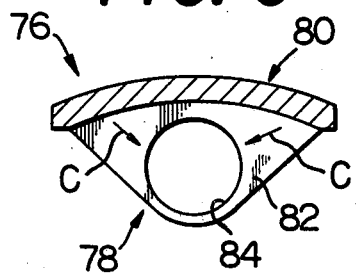

Therefore, if the caliper had a configuration similar to that of a caliper 76 which is disclosed in copending application Ser. No. 320,932 and shown in FIGS. 4 and 5, the application of reaction forces A, upon brake actuation, to cylinder and reaction portions 78 and 79 in the directions of causing them to deflect away from each other would not actually cause the same portions to simply deflect in the directions of the reaction forces A because both lateral ends of a bridging portion 80 having a circular arc configuration in cross section serve to retain the cylinder portion 78 at both lateral ends thereof, upon application of the reaction forces. In other words, both ends of the bridging portion 80 impart a tensile force to both ends of the cylinder portion 78 in the direction toward the reaction portion 79, i.e., in the direction indicated by arrows B in FIG. 4. Thus, the cylinder wall section 82 of the cylinder portion 78 facing the reaction portion 79 is deformed such that a cylinder bore 84 centrally formed therein is moved toward its bottom. Therefore, compression forces C are applied to the open end portion of the cylinder bore 84 in the direction indicated by arrows C in FIG. 5, whereby the cylindrical open end portion of the bore 84 is deformed to be of an elliptical shape and its diameter in horizontal cross section is reduced to "d" as shown in FIG. 4. This reduction in the diameter, even when it is small, will cause an interference between the cylinder portion 78 and a piston (not shown) slidably and fluid-tightly fitted therein, resulting in abnormal operation of the piston upon brake application and inducing abnormal wearing of the piston and the cylinder bore surfaces and the resultant fluid leakage from the cylinder. Such deformation of the diameter of the cylinder bore 84 becomes greater as the length of the cross sectional circular arc of the bridging portion 80 is made greater for maintaining the rigidity of the caliper 76 while reducing the wall thickness of the bridging portion 80.

Figure 6:
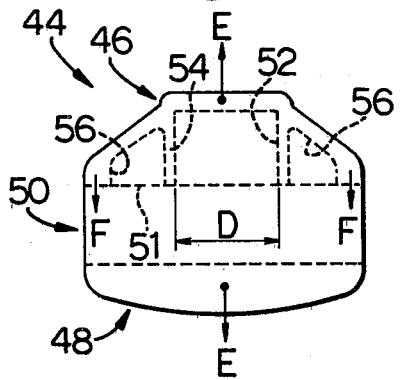
FIGS. 6 and 7 are a plan view and a cross sectional elevational view of the caliper of FIG. 1, respectively, explaining delivery of force applied to the caliper upon brake application.
Figure 7:
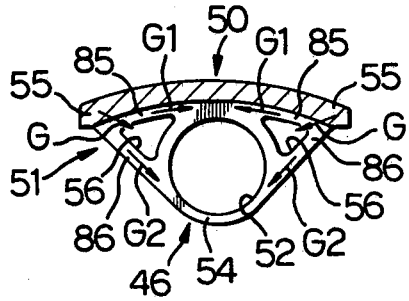

On the other hand, the caliper 44 according to this invention, which has the openings 56 between both ends 55 of the bridging portion 50 and the segment 57 of the open end portion of the cylinder 54, will suffer substantially no variation in the diameter D (shown in FIG. 6) of the cylinder bore 52 when the reaction forces E are applied to the caliper in the directions that cause the cylinder and reaction portions 46 and 48 to move or open away from each other upon brake application and the ends 55 of the bridging portion 50 impart a tensile force F to the lateral ends of the cylinder wall section 51 facing the reaction portion in the direction toward the reaction portion 48, because the compression force G, shown in FIG. 7, imparted from the lateral ends of the cylinder wall section 51 toward the cylinder bore 52 is divided by the openings 56 into two components G1 and G2 which are actually delivered along the lines which pass the ends 55 and are tangent with the circumference of the open end portion of the cylinder 54, whereby the compression force G1 acts to compress, via a circular arc portion 85 of the cylinder wall section 51, the upper circumferential wall portion of the cylinder 54 circularly of the cylinder bore 52, and the compression force G2 acts to compress, via a bracing portion 86 of the cylinder wall section 51, the lower circumferential wall portion of the cylinder 54 circularly of the cylinder bore 52. Thus, on the caliper 44 of this embodiment, the diameter of the open end portion of the cylinder bore 52 is virtually not at all affected by the deformation of the caliper 44 even when the bridging portion 50 has a longer cross sectional circular arc, and therefore there arises neither abnormal wear of the piston and the internal surface of the cylinder bore 52 nor fluid leakage from the cylinder bore. Further, the provision of the openings 56 which eventually remove a considerable amount of stock from the cylinder portion 46, produces an advantage of additional weight saving of the caliper 44.

While there has been described a preferred embodiment of the invention with a certain particularity, it will be understood that various changes and modifications may be made therein without departing from the spirit and scope of the invention.

Figure 8:
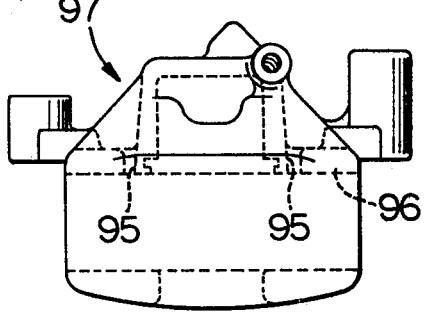
FIGS. 8 and 9 are, respectively, a plan view and a cross sectional elevational view of a caliper of another embodiment of this invention.
Figure 9:
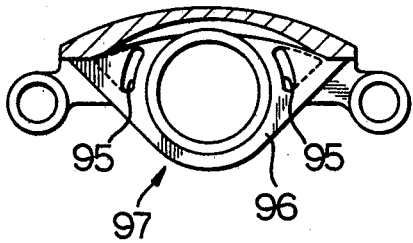

For example, as shown in FIGS. 8 and 9, openings 95 may be formed through the entire thickness of a cylinder wall section 96 for more cooling effects on a cylinder portion 97 through ventilation. Further, since the openings 56 are formed between the ends 55 of the bridging portion 50 and the open end portion of the cylinder bore 52 for the purpose of dividing the compression force G which is delivered from the said ends 55 toward the cylinder 54, into components thereof which are delivered along the said tangent lines, the opening 95 may be provided in the form of slits or slots which have a proper amount of open space.

It is also appreciated that various changes may be made in configuration of the cylinder wall section 51 and in size of the cylinder 54, as long as the wall section 51 supports the open end portion of the cylinder 54 and has openings between the said open end portion of the cylinder 54 and both ends 55 of the bridging portion 50.

What is claimed is:

1. A caliper housing of a disc brake for a vehicle including a disc rotor, a pair of brake pad assemblies disposed on opposite sides of the rotor, and a torque member fixed to the vehicle to support said caliper housing and the pad assemblies movably along an axis of rotation of the rotor, said caliper housing comprising:
   a cylinder portion located on one side of the rotor and including a fan-shaped cylinder wall section which is formed with a cylinder having a cylinder bore open at one end thereof, said cylinder wall section having a sectorial external profile in cross section in a first plane perpendicular to said axis, and said cylinder wall section including a circumferential wall which defines said cylinder bore and which is substantially inscribed to said sectorial external profile;
   a reaction portion located on the other side of the rotor opposite said cylinder portion; and
   a bridging portion bridging said cylinder and reaction portions and cooperating with the same so as to constitute an integral, substantially saddle-shaped one-piece shell structure which straddles an outer peripheral portion of the rotor and said pad assemblies, said bridging portion having a substantially circular arc configuration in cross section in a second plane parallel to said first plane, a quotient of a width of said bridging portion in said cross section divided by a thickness thereof being not less than 11; and
   said cylinder wall section having in each of two areas thereof at least one opening, each of said areas being defined by a pair of lines which pass the associated one of opposite ends of the circular arc of said bridging portion and which are tangent with the circumference of said circumferential wall at an open end of said cylinder, and by a segment of said circumference of said circumferential wall defined by points of tangency of said pair of lines with said circumference.

2. A caliper housing as recited in claim 1, wherein said at least one opening is formed through an entire thickness portion of said cylinder wall section.

3. A caliper housing as recited in claim 1, wherein said at least one opening has a substantially triangular vertical cross section.

4. A caliper housing as recited in claim 1, wherein said at least one opening further comprises at least one slot.

5. A caliper housing as recited in claim 1, further comprising a curved wall for supporting said cylinder at a portion near the bottom thereof wherein said curved wall extends from the extremities of both said bridging portion and said cylinder wall section, and terminates at the circumferential wall of said portion near the bottom.

6. A caliper housing as recited in claim 1, wherein said housing further comprises pin-sliding type housing.

* * * * *